(12) United States Patent
Wang

(10) Patent No.: US 12,098,739 B1
(45) Date of Patent: Sep. 24, 2024

(54) CLAMP ASSEMBLY

(71) Applicant: Henry Wang, Winter Springs, FL (US)

(72) Inventor: Henry Wang, Winter Springs, FL (US)

( * ) Notice: Subject to any disclaimer, the term of this patent is extended or adjusted under 35 U.S.C. 154(b) by 0 days.

(21) Appl. No.: 18/583,366

(22) Filed: Feb. 21, 2024

(51) Int. Cl.
*F16B 2/06* (2006.01)
*B25B 5/00* (2006.01)
*B25B 5/10* (2006.01)
*B25B 5/14* (2006.01)

(52) U.S. Cl.
CPC ............... *F16B 2/065* (2013.01); *B25B 5/00* (2013.01); *B25B 5/10* (2013.01); *B25B 5/14* (2013.01)

(58) Field of Classification Search
CPC ... F16B 2/065; F16B 1/00; B25B 5/00; B25B 5/10; B25B 5/107; B25B 1/08; B25B 5/16
See application file for complete search history.

(56) References Cited

U.S. PATENT DOCUMENTS

| | | | |
|---|---|---|---|
| 363,041 A | | 5/1887 | Baker et al. |
| 884,772 A | * | 4/1908 | Sorensen |
| 2,485,876 A | | 6/1945 | Guest |
| 2,519,107 A | | 8/1950 | Brown |
| 2,666,352 A | | 1/1954 | Philips |
| 2,796,787 A | | 4/1955 | Aske |
| 2,894,548 A | | 1/1956 | Peck |
| 2,766,649 A | | 10/1956 | Labry, Jr. |
| 2,918,172 A | | 8/1960 | Sloboda |
| 3,322,423 A | | 5/1967 | Popow |
| 3,712,606 A | * | 1/1973 | Cole ........................ B25B 5/106 269/92 |
| 3,768,797 A | | 10/1973 | Kartasuk et al. |
| 3,811,668 A | * | 5/1974 | Kotter ..................... B25B 5/163 269/276 |
| 4,121,815 A | | 10/1978 | Paterson |
| 4,747,588 A | | 5/1988 | Dillhoff |
| 4,918,038 A | * | 4/1990 | Samuels ................. C08F 10/02 502/119 |
| 5,135,209 A | | 8/1992 | Penny |
| D340,851 S | | 11/1993 | Sorensen |
| 5,971,378 A | | 10/1999 | Sweeney |
| 6,029,964 A | | 2/2000 | Bohl |

(Continued)

OTHER PUBLICATIONS

PCT/US20/063256 International Search Report and Written Opinion, dated Apr. 6, 2021, 13 pages.

(Continued)

*Primary Examiner* — Tan Le
(74) *Attorney, Agent, or Firm* — Wolter VanDyke Davis, PLLC; Robert L. Wolter

(57) ABSTRACT

An apparatus (100), including: a U-pad body (200) having a bottom (210), a top (212), a front side (214), a rear side (216), a first side (218), a second side (220), a clamping groove (204) that is recessed into the bottom, and a U-pad body pivot feature (202); and an adapter body (300) disposed atop the U-pad body and including an adapter pivot feature (302). The adapter pivot feature and the U-pad body pivot feature cooperate to enable the U-pad body to pivot relative to the adapter body. The apparatus further includes: an anchor nut (400) disposed below the U-pad body; a tightening nut (500) disposed above the adapter body; and a stud (600) that is secured to the anchor nut, that is secured to the tightening nut, and that is passes through the adapter body hole and through the U-pad.

21 Claims, 15 Drawing Sheets

(56) References Cited

U.S. PATENT DOCUMENTS

| | | | |
|---|---|---|---|
| 6,367,787 B1 | 4/2002 | Poole et al. | |
| 6,431,534 B1 * | 8/2002 | Orosz | B25B 5/163 |
| | | | 269/268 |
| 6,698,071 B1 | 3/2004 | Greer, Jr. et al. | |
| 7,254,895 B1 | 8/2007 | O'Donnell | |
| D740,639 S | 10/2015 | Wang | |
| 10,307,894 B1 | 6/2019 | Wong | |
| D870,547 S | 12/2019 | Liao | |
| 11,472,005 B2 * | 10/2022 | Wang | B25B 5/163 |
| 2002/0088868 A1 | 7/2002 | Kirchner et al. | |
| 2004/0232608 A1 | 11/2004 | Wong | |
| 2006/0208407 A1 | 9/2006 | Wang | |
| 2014/0165340 A1 | 6/2014 | Chuang | |
| 2016/0023330 A1 | 1/2016 | Chuang | |
| 2017/0355066 A1 | 12/2017 | Li | |
| 2018/0036867 A1 | 2/2018 | Wang | |
| 2018/0099404 A1 | 4/2018 | Wang | |
| 2019/0054584 A1 * | 2/2019 | Stark | B23Q 3/069 |
| 2021/0086328 A1 | 3/2021 | Barraco | |
| 2021/0299768 A1 | 9/2021 | Wang | |

OTHER PUBLICATIONS

Microjig; Microjig Matchfit X-Pad Manual 2022; https://assets-global.website-files.com/5cfd83cf1c26ab7392063e1f/5efd59221a8c8e615c341816_X-Pad-manual-v8.0-WEB.pdf; Jan. 12, 2024; Orlando, FL; 1 pg.

* cited by examiner

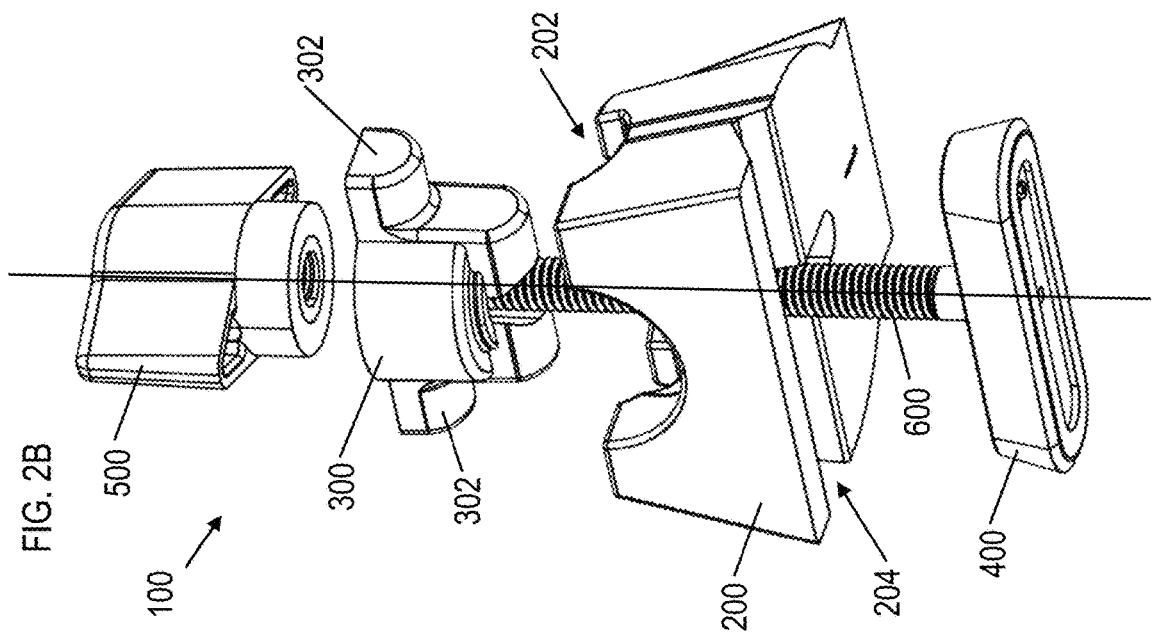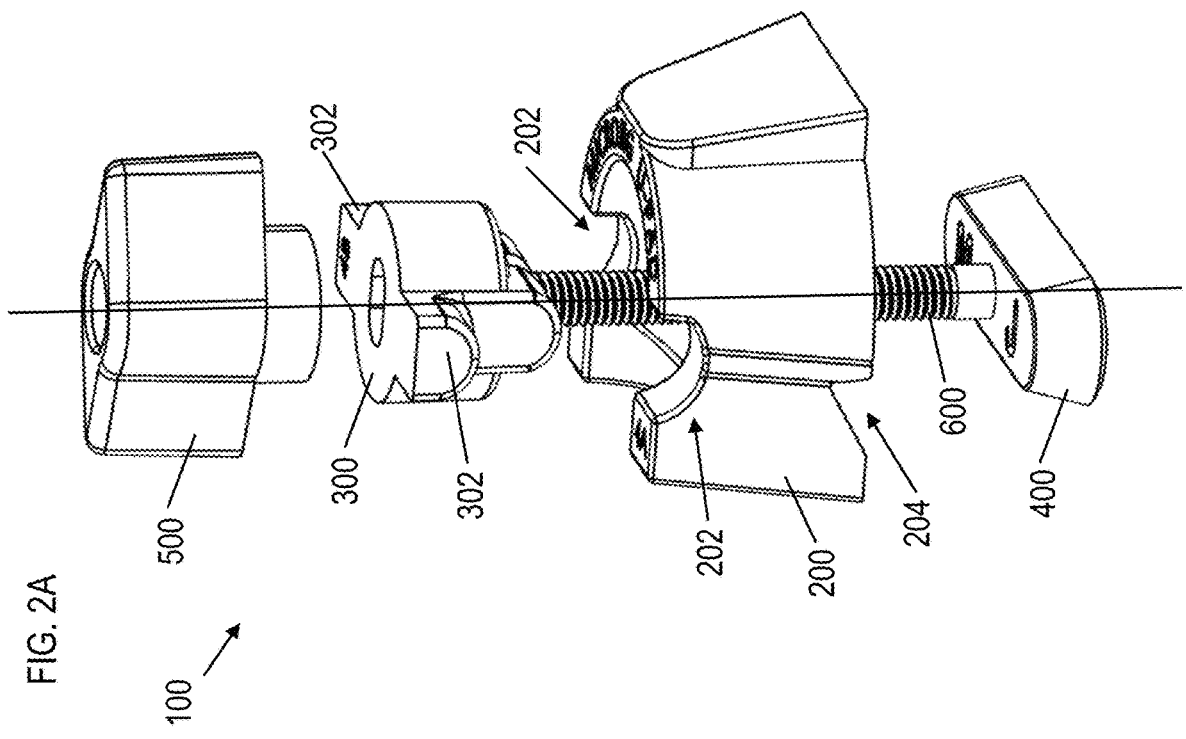

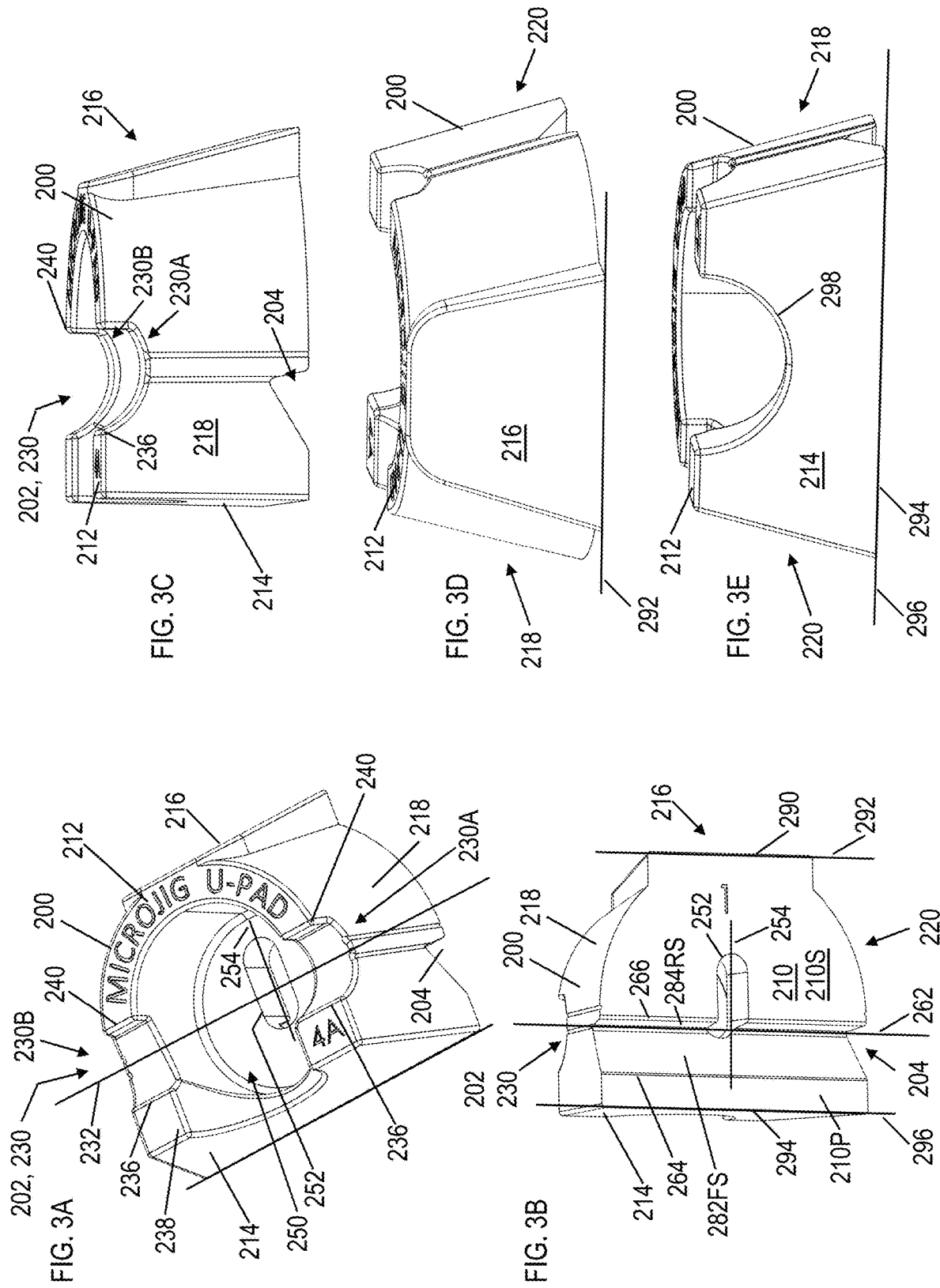

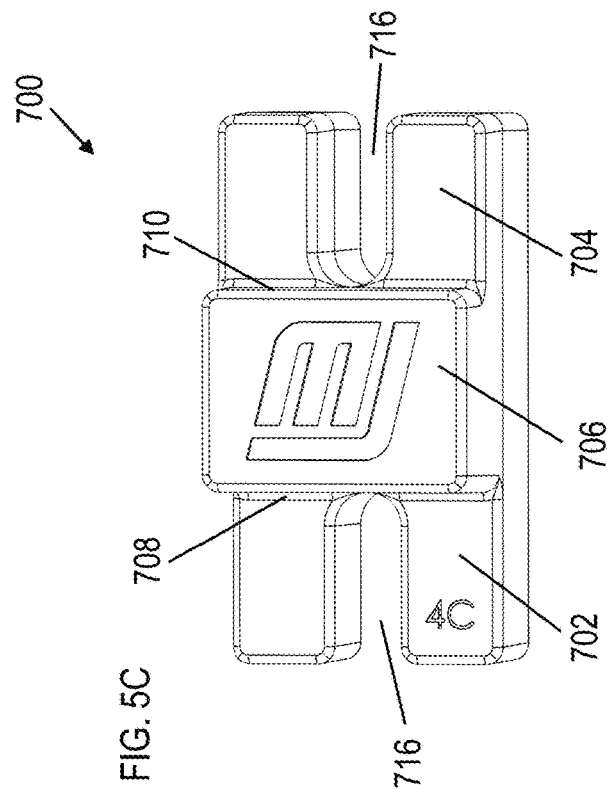
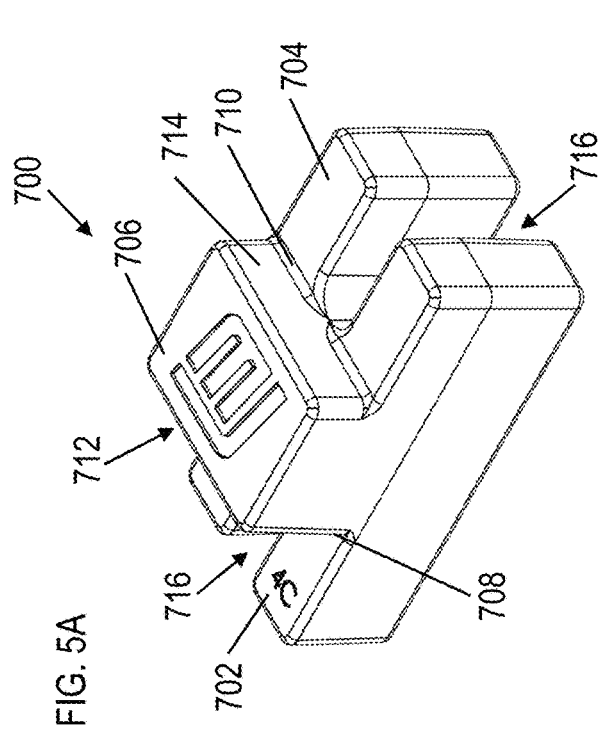
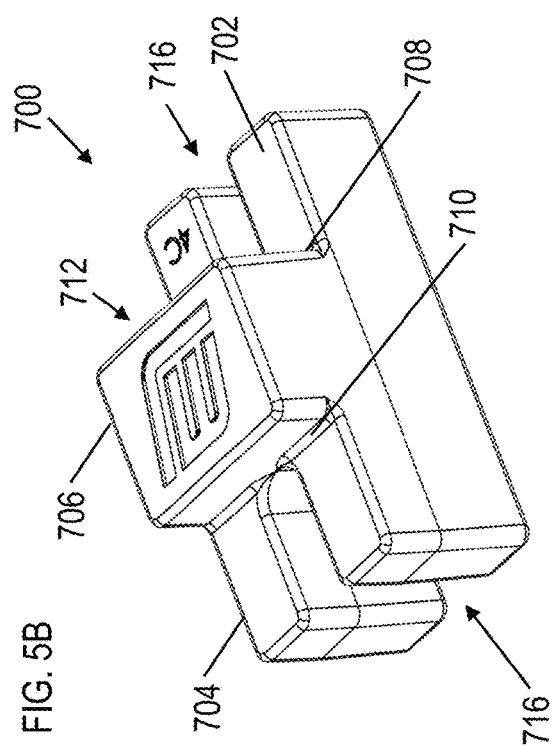

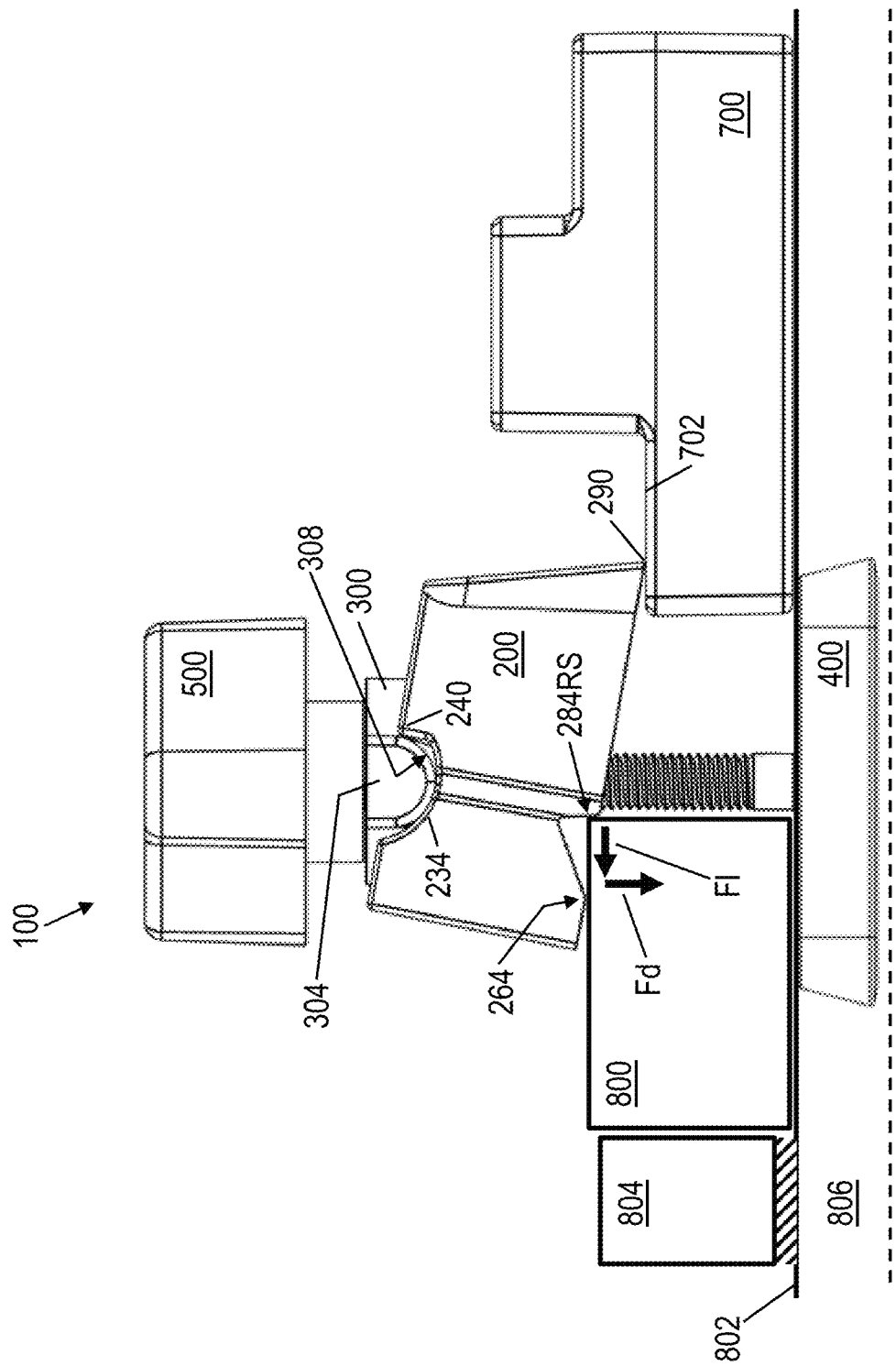

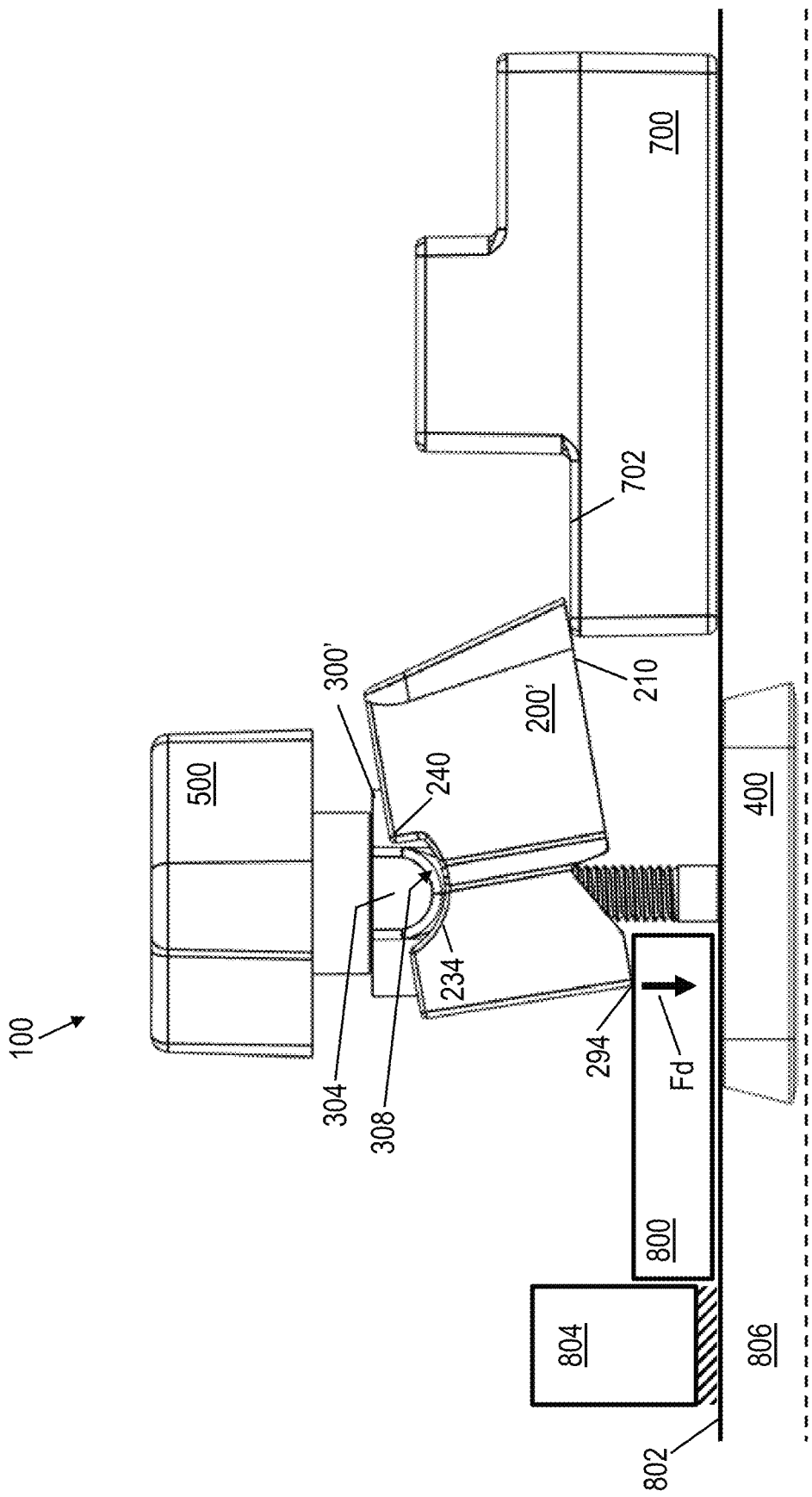

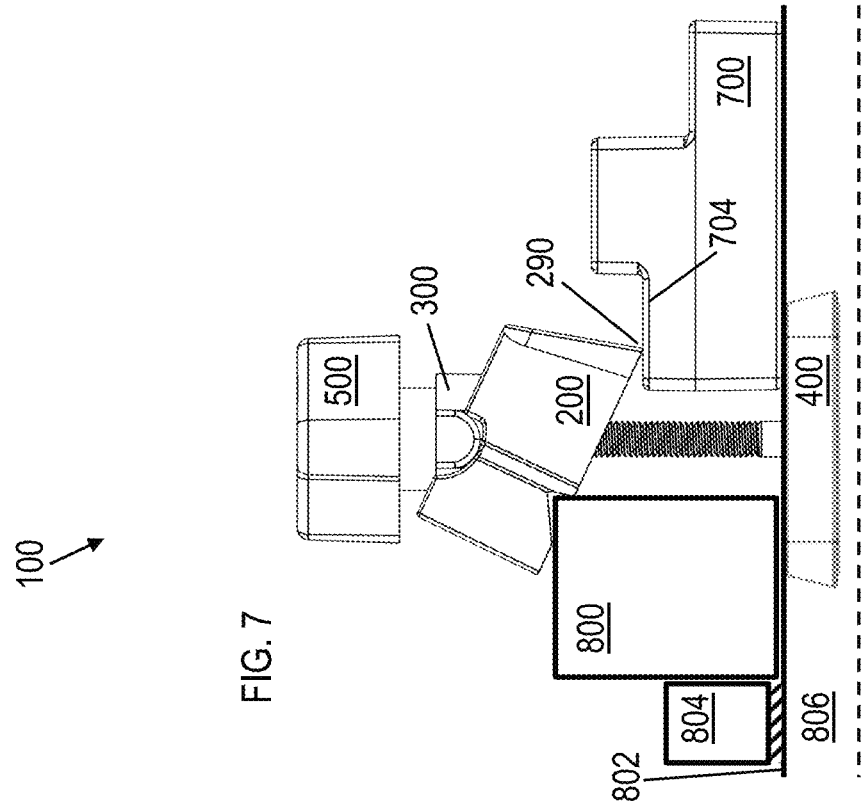

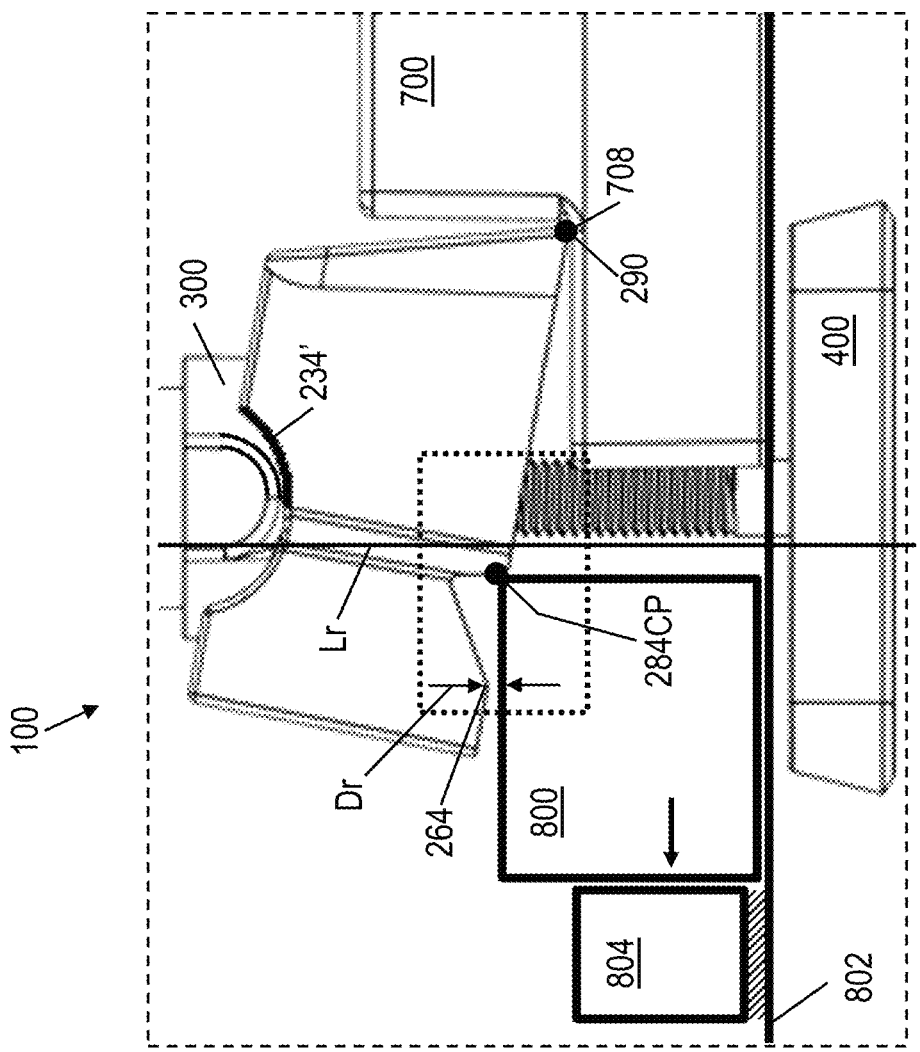
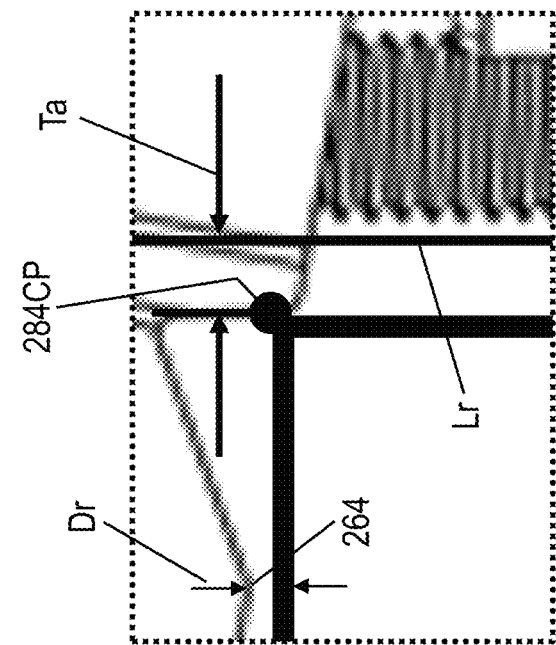
FIG. 10C
FIG. 10D

US 12,098,739 B1

CLAMP ASSEMBLY

FIELD OF THE INVENTION

This invention relates to a clamp assembly used to clamp a workpiece in a fixed position on a slotted worktable.

BACKGROUND OF THE INVENTION

With respect to woodworking, metalworking apparatuses, and the like, (e.g., CNC router, drill press, milling machine), clamps may be used to secure workpieces directly to worktable tops. Conventionally, clamps that work in conjunction with a tabletop will apply a clamping force downward onto the workpiece in a direction normal to the upper surface of the tabletop, thereby clamping the workpiece down to the table (or onto another workpiece disposed on the table etc.) In such a configuration, friction between the workpiece and the tabletop may be the only resistance to lateral movement of the workpiece along the worktable upper surface. This friction may be insufficient to hold the workpiece in position laterally during machining operations. As a result, the workpiece may slide on the worktable during the machining operations. Consequently, there is room in the art for improvement.

BRIEF DESCRIPTION OF DRAWINGS

The invention is explained in the following description in view of the drawings:

FIG. 2A and FIG. 2B are perspective views of the clamp assembly of FIG. 1A in expanded form.

FIG. 3A to FIG. 3F are various views of an example embodiment of a U-pad body of the clamp assembly of FIG. 2A.

FIG. 5A to FIG. 5C are various views of an example embodiment of a pad block of the clamp assembly of FIG. 1A.

FIG. 6A to FIG. 6D show the clamp assembly of FIG. 1A in various clamping configurations using a lower ledge of the pad block.

FIG. 7 shows the clamp assembly of FIG. 1A in a clamping configuration using a middle ledge of the pad block.

FIG. 8 shows the clamp assembly of FIG. 1A in a clamping configuration using an upper ledge of the pad block.

FIG. 10C is a closeup of the area indicated in FIG. 10B.

FIG. 10D is a closeup of the area indicated in FIG. 10C.

DETAILED DESCRIPTION OF THE INVENTION

The present inventor has devised a unique and innovative clamp assembly that is suitable for clamping a workpiece on a worktable having slots. The clamp assembly disclosed herein can be secured in a slot in an infinite number of positions relative to a workpiece. The clamping action is simple and ensures the workpiece is also held down on the worktable while being clamped laterally.

Figure 1B:
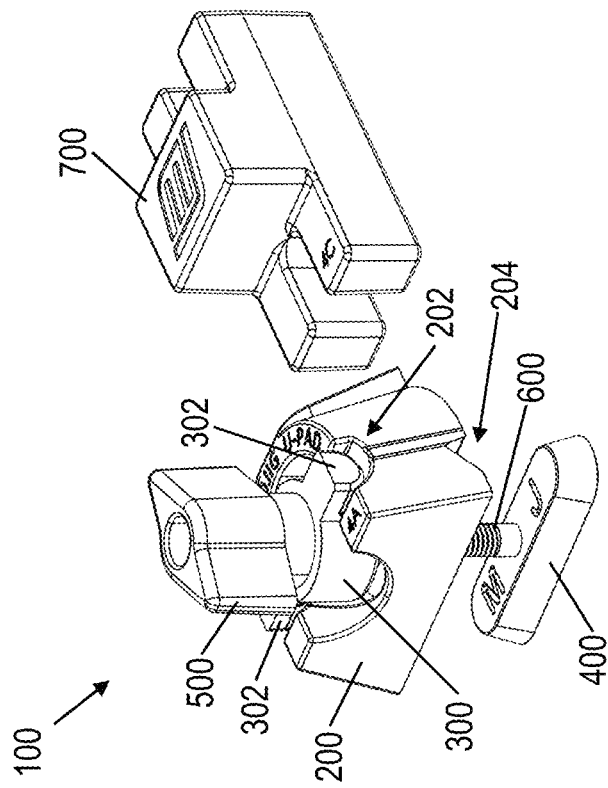
FIG. 1A and FIG. 1B are perspective views of an example embodiment of a clamp assembly with an example embodiment of a pad block as disclosed herein.
Figure 1A:
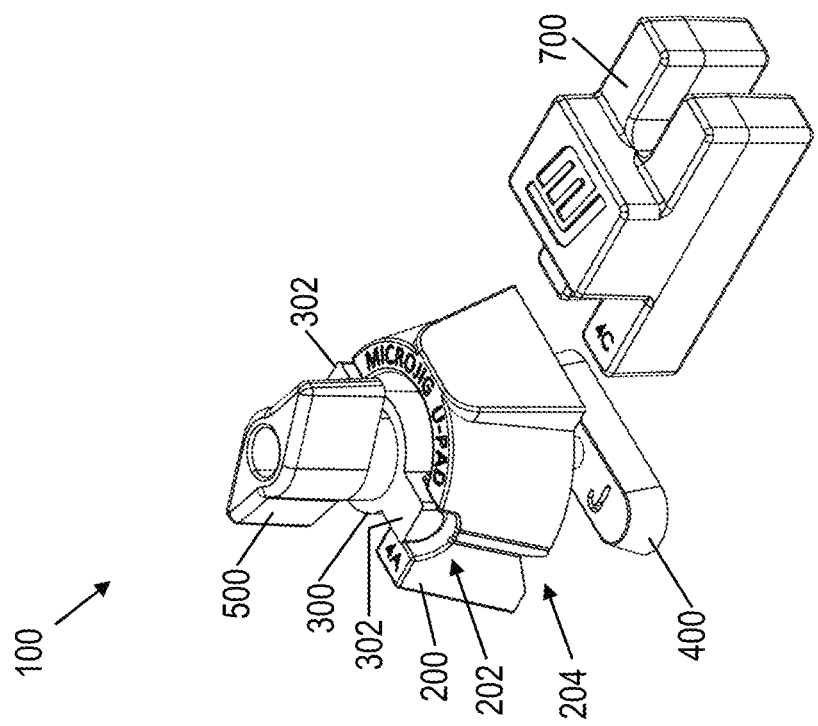

FIG. 1A and FIG. 1B are perspective views of an example embodiment of a clamp assembly with an example embodiment of a pad block disclosed herein. FIG. 2A and FIG. 2B are perspective views of the clamp assembly of FIG. 1A.

The clamp assembly 100 includes a U-pad body 200, an adapter body 300, an anchor nut 400, a tightening nut 500, and a stud 600. The clamp assembly 100 may be used with a pad block 700.

When assembled as shown in FIG. 1A and FIG. 1B, the adapter body 300 sits at least partly atop the U-pad body 200. Optionally, as shown in this example embodiment, the adapter body 300 may sit at least partly within the U-pad body 200. The U-pad body 200 can pivot relative to the adapter body 300. This pivoting action is made possible by a cooperation between a U-pad body pivot feature 202 and an adapter body pivot feature 302.

The anchor nut 400 is disposed below/under the U-pad body 200. In a non-limiting example embodiment, the anchor nut 400 has a dovetail shape that is configured to work in a dovetail slot created using a conventional dovetail router bit (e.g., a ½"×14 degree router bit). Other shapes are possible, such as an anchor nut suitable for use in a T-slot and the like. The tightening nut 500 is disposed above the adapter body 300. The stud 600 is secured to the anchor nut 400, is secured to the tightening nut 500, and passes through the adapter body 300 and through the U-pad body 200. When the anchor nut 400 is disposed in a slot of a worktable, tightening of the tightening nut 500 presses the adapter body 300 downward onto the U-Pad body 200, which presses the U-Pad body 200 downward onto a workpiece that is disposed between the worktable and the U-Pad body 200. Using an anchor nut 400 in a slot allows the clamp assembly 100 to be placed in any desired position relative to the workpiece. This, in turn, allows for optimization of the clamping of the workpiece.

A clamping groove 204 in the U-pad body 200 is configured to receive therein a corner of a workpiece. In addition to the conventional option of clamping downward on the top of a workpiece, the clamping groove provides the option of clamping a corner of the workpiece. Clamping the corner can, in certain example embodiments, provide a lateral clamping force on the workpiece in addition to the downward clamping force.

FIG. 3A to FIG. 3F are various views of the example embodiment of a U-pad body of the clamp assembly of FIG. 2A.

The U-pad body 200 includes a bottom 210, a top 212 disposed opposite the bottom 210, and sides disposed between the bottom 210 and the top 212. The sides include a front side 214, a rear side 216 opposite the front side 214, a first side 218 between the front side 214 and the rear side 216, and a second side 220 between the front side 214 and the rear side 216 and opposite the first side 218.

The U-pad body pivot feature 202 includes a pivot groove 230 that is recessed into the top 212, that extends between the first side 218 and the second side 220, and that extends along a pivot groove longitudinal axis 232. In a non-limiting example embodiment, the pivot groove longitudinal axis 232 may be a center of curvature of a concave shape 234 of the pivot groove 230.

The pivot groove 230 defines a pivot groove front corner 236 that is formed where the pivot groove 230 meets a top surface 238 of the top 212 and that extends parallel to the pivot groove longitudinal axis 232. The pivot groove 230 also defines a pivot groove rear corner 240 that is formed where the pivot groove 230 meets the top surface 238 of the top 212 and that extends parallel to the pivot groove longitudinal axis 232. Any corner disclosed herein is not limited to a sharp corner. A corner may be as small as a respective manufacturing technique permits. Alternately, a corner may be rounded above the minimum radius of the respective manufacturing technique.

The pivot groove 230 includes the concave shape 234 that terminates at the pivot groove front corner 236 and a non-concave shape 242 that terminates at the pivot groove rear corner 240. The pivot groove may be continuous or discontinuous along the pivot groove longitudinal axis 232. The non-concave shape 242 may be straight or convex. The concave shape 234 and the non-concave shape 242 meet at a junction 244. In an alternate example embodiment, the non-concave shape 242 may not be present. In such a case, the concave shape 234 terminates at the pivot groove front corner 236 and at a pivot groove rear corner 240'.

In this example embodiment, the pivot groove includes a pivot groove first portion 230A and a pivot groove second portion 230B that is separated from the pivot groove first portion 230A along the pivot groove longitudinal axis 232. The U-pad body 200 further includes an adapter recess 250 that is recessed into the top 212, that is disposed between the pivot groove first portion 230A and the pivot groove second portion 230B, and that is configured to receive the adapter body 300 at least partly therein.

The U-pad body 200 further includes a U-pad body slot 252 that passes there through. In this example embodiment, the U-pad body slot 252 passes from the adapter recess 250 through the bottom 210 and is elongated along a slot longitudinal axis 254 that is oriented perpendicular to the pivot groove longitudinal axis 232.

The clamping groove 204 is recessed into the bottom 210 and opens through the first side 218 and through the second side 220. An example configuration for the clamping groove 204 is disclosed as a groove 110 in U.S. Pat. No. 11,472,005 to Wang, which is incorporated herein in its entirety.

The clamping groove 204 may be continuous or discontinuous between the first side 218 and the second side 220. The clamping groove 204 includes a clamping groove vertex 260 that defines a clamping groove longitudinal axis 262 which is parallel to the pivot groove longitudinal axis 232. In embodiments where a stress-relieving rounded fillet exists in the clamping groove 204, the clamping groove vertex 260 may be theoretical and disposed in the U-pad body 200 where the sides of the clamping groove 204 intersect.

The clamping groove further includes a clamping groove front corner 264 that is formed where the clamping groove 204 meets a bottom surface 210S of the bottom 210, that is disposed between the clamping groove vertex 260 and the front side 214, and that extends parallel to the clamping groove longitudinal axis 262.

The clamping groove 204 further includes clamping groove rear corner 266 that is formed where the clamping groove 204 meets the bottom surface 210S of the bottom 210, that is disposed between the clamping groove vertex 260 and the rear side 216, and that extends parallel to the clamping groove longitudinal axis 262.

Figure 3F:
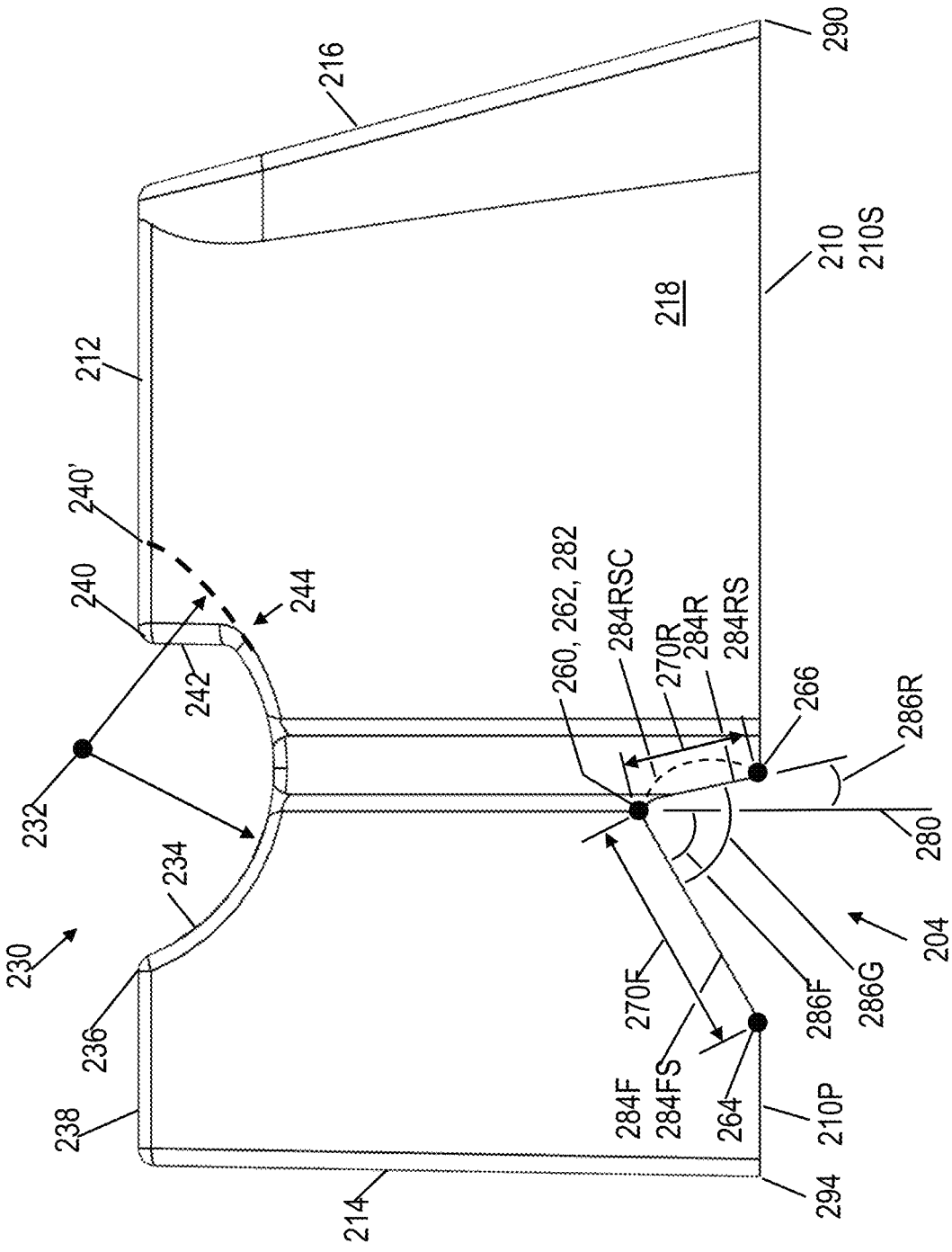
Figure 4C:
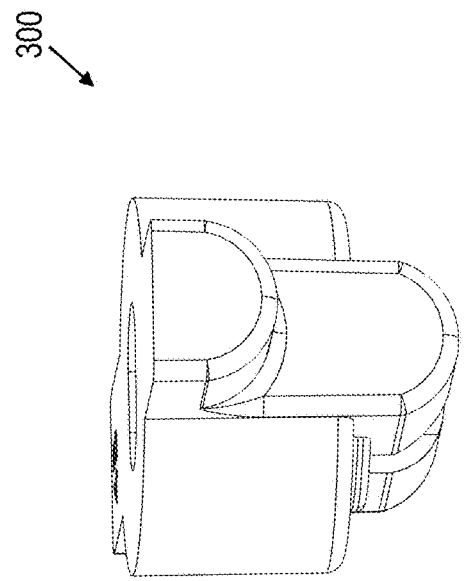
FIG. 4A to FIG. 4D are various views of an example embodiment of an adapter of the clamp assembly of FIG. 2A.
Figure 4D:
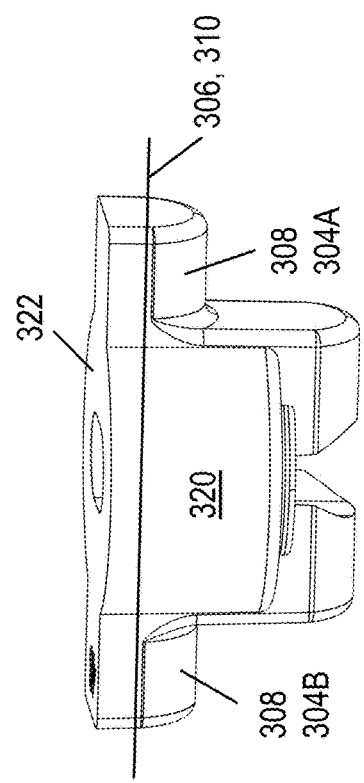
Figure 4A:
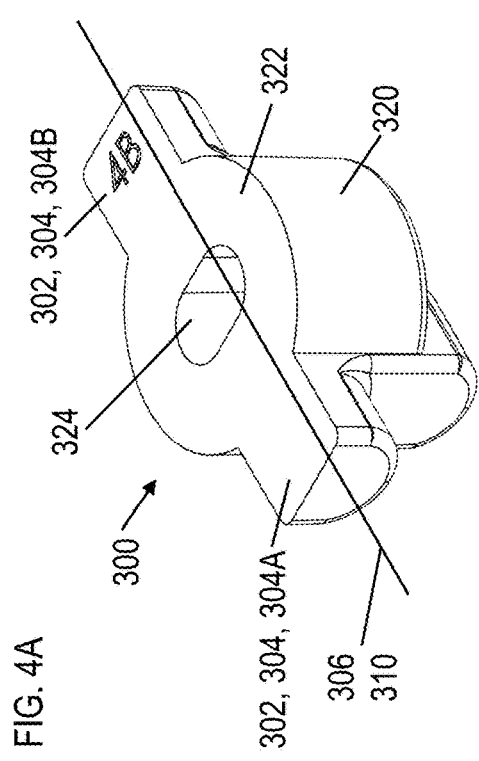
Figure 4B:
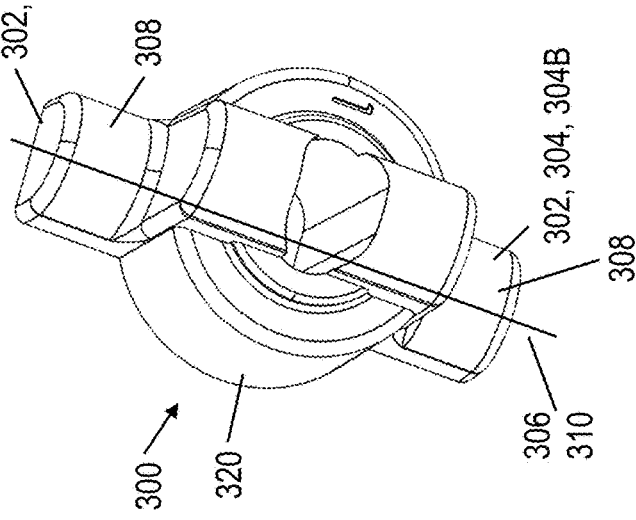

Although not necessary, the clamping groove 204 is asymmetric about the clamping groove vertex 260, which is best seen when viewed as shown in FIG. 3F (parallel to the clamping groove longitudinal axis 262). As seen in FIG. 3F, a shortest distance 270F from the clamping groove vertex 260 to the clamping groove front corner 264 is greater than a shortest distance 270R from the clamping groove vertex 260 to the clamping groove rear corner 266. In this example embodiment, the shortest distance 270F is determined by a line that is perpendicular to and intersects both the clamping groove longitudinal axis 262 and the clamping groove front corner 264. In this example embodiment, the shortest distance 270R is determined by a line that is perpendicular to and intersects both the clamping groove longitudinal axis 262 and the clamping groove rear corner 266. The clamping groove 204 is deemed asymmetric when the distances 270F, 270R, are not equal.

With continued reference to FIG. 3F, a normal line 280 is disposed normal to the bottom surface 210S and passes through the clamping groove longitudinal axis 262 at an intersection point 282. A front line 284F is defined by the shortest distance 270F from the intersection point 282 to the clamping groove front corner 264. The front line represents a front side 284FS of the clamping groove 204 that is planar in this example embodiment.

A rear line 284R is defined by the shortest distance 270R from the intersection point 282 to the clamping groove rear corner 266. The rear line 284R represents a rear side 284RS of the clamping groove 204 that is planar in this example embodiment.

The front side 284FS shown is planar, but it need not be. Likewise, the rear side 284RS shown is planar, but it need not be. In alternate example embodiments, either or both sides 284FS, 284RS can be concave or convex. An example of a concave rear side 284RSC is shown as a dashed line. The front side 284FS can be similarly shaped.

The front line 284F and the normal line 280 define a front bevel angle 286F. The rear line 284R and the normal line 280 define a rear bevel angle 286R. The front bevel angle 286F is larger than the rear bevel angle 286R. The clamping groove 204 is deemed asymmetric when the front bevel angle 286F and the rear bevel angle 286R are not equal.

Although it is not necessary, as shown in FIG. 3F, the front line 284F and the rear line 284R define a groove angle 286G that is less than ninety (90) degrees.

In an example embodiment, the front bevel angle 286F is sixty (60) degrees. Other angles are acceptable so long as they are in accord with the teachings disclosed herein. In an embodiment, the rear bevel angle 286R is less than forty-five (45) degrees. In an example embodiment, the rear bevel angle 286R is less than thirty (30) degrees. In an example embodiment, the front bevel angle 286F is sixty (60) degrees, the rear bevel angle 286R is twelve (12) degrees, and the resulting groove angle 286G is seventy-two (72) degrees.

The U-pad body 200 further includes a bottom rear corner 290 that is defined by the bottom 210 and the rear side 216. Although it is not necessary, the bottom rear corner 290 shown is linear and extends along a rear corner longitudinal axis 292 that is parallel to the clamping groove longitudinal axis 262. In alternate example embodiments, the rear corner may be composed of one or more pads or the like.

The U-pad body 200 further includes a bottom front clamping corner 294 that is defined by the bottom 210 and the front side 214. Although it is not necessary, the bottom front clamping corner 294 shown is linear and extends along a bottom front clamping corner longitudinal axis 296 that is parallel to the clamping groove longitudinal axis 262. The bottom front clamping corner 294 is optionally set apart from the clamping groove front corner 264 by a portion 210P of the bottom 210. However, the bottom front clamping corner 294 and the clamping groove front corner 264 may be the same. Alternately, instead of having the bottom front clamping corner 294, pads or other features may instead be used. Likewise, instead of having a clamping groove front corner 264, pads or other features may instead be used.

The U-pad body 200 further includes a relief 298 that prevents interference between the U-pad body 200 and the adapter body 300 when the U-pad body 200 rotates relative to the adapter body 300.

FIG. 4A to FIG. 4D are various views of the example embodiment of the adapter of the clamp assembly of FIG. 2A.

The adapter pivot feature 302 of the adapter body 300 includes a pivot dowel 304 that defines an adapter body pivot axis 306 and that is configured to cooperate with the pivot groove 230 to enable the U-pad body 200 to pivot around the adapter body pivot axis 306. The pivot dowel 304 includes convex dowel surfaces 308 that contact the pivot groove 230. The convex dowel surfaces 308 may define an entire cylinder shape (not shown) or only a circumferential portion of the cylindrical shape as shown.

In an example embodiment, a center of curvature of the convex dowel surfaces 308 defines the adapter body pivot axis 306 as well as a dowel longitudinal axis 310. In this example embodiment, the concave shape 234 of the pivot groove 230 and the pivot groove rear corner 240 of the U-pad body 200 contact the convex dowel surfaces 308 as the U-pad body 200 pivots. The U-pad body 200 thereby pivots around the adapter body pivot axis 306 during at least a portion of its range of possible pivot positions. In certain positions, the pivot groove rear corner 240 may ride along the pivot dowel 304 beyond an end of the convex dowel surfaces 308.

Figure 6A:
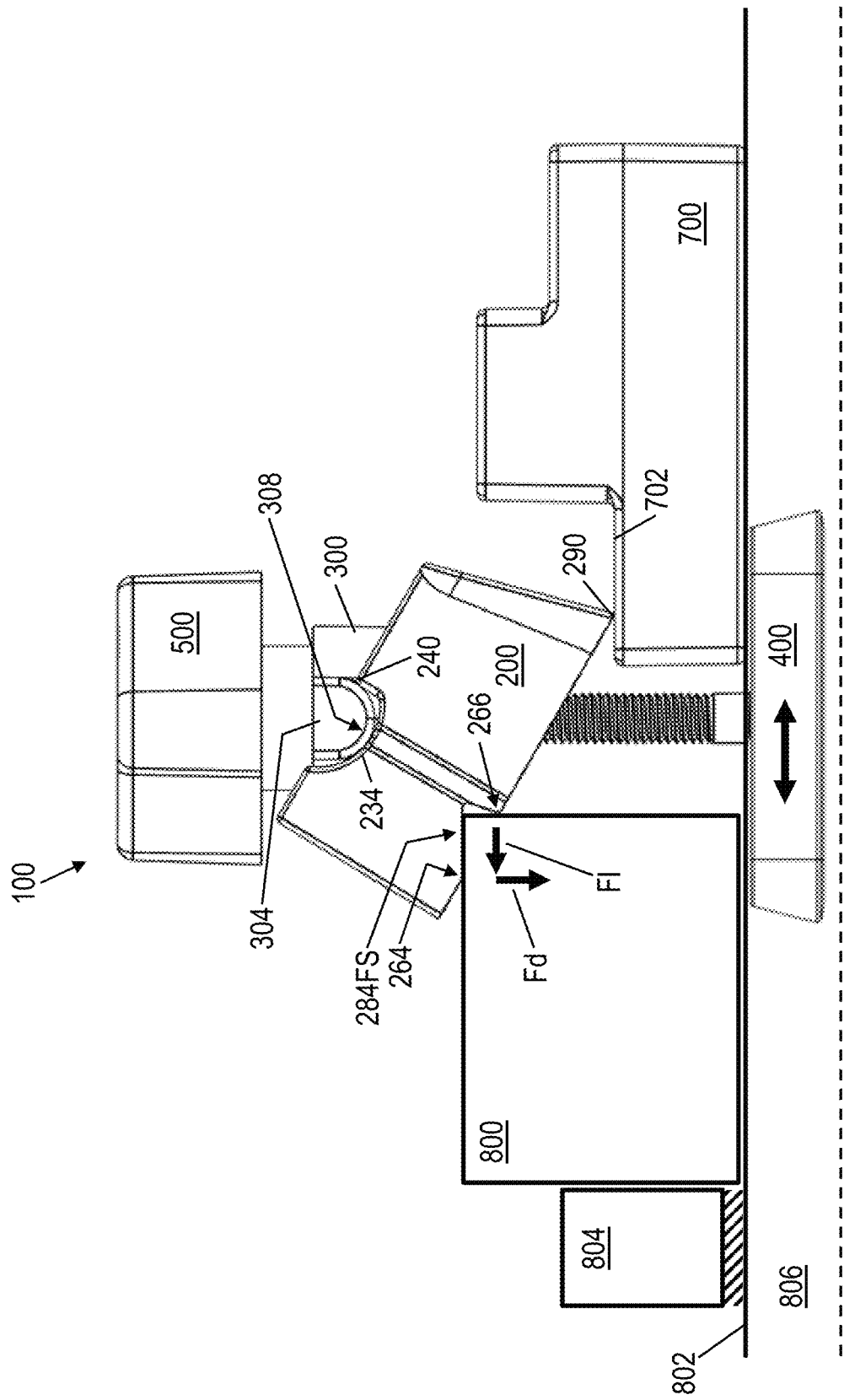

In this example embodiment, the pivot groove rear corner 240 provides a second point of contact with the convex dowel surfaces 308 and thereby limits leftward movement (as seen in FIG. 6A) of the U-pad body 200 relative to the adapter body 300. This, in turn, allows for easier positioning of the clamp assembly 100 when preparing for a clamping operation.

In this example embodiment, the pivot dowel 304 is discontinuous and includes a dowel first portion 304A configured to cooperate with the pivot groove first portion 230A and a dowel second portion 304B configured to cooperate with the pivot groove second portion 230B.

The dowel first portion 304A and the dowel second portion 304B are separated by a dowel central portion 320 that is configured to fit at least partly inside the adapter recess 250 in the U-pad body 200. The dowel central portion 320 is accommodated by the relief 298 in the U-pad body 200 when the U-pad body 200 rotates relative to the adapter body 300.

The adapter body 300 further includes an adapter body upper surface 322 and an adapter body through hole 324. The adapter body through hole 324 may be round or may be slotted as shown. A slotted shape may provide additional flexibility when positioning the clamp assembly 100 during a clamping operation. The adapter body through hole 324 is oriented perpendicular to the adapter body upper surface 322 and configured to align with the U-pad body slot 252 when the clamp assembly 100 is assembled together.

When advanced along the stud 600, the tightening nut 500 presses on the adapter body upper surface 322 during a clamping operation.

While the pivot operation is enabled by a U-pad body pivot feature 202 that is concave and an adapter body pivot feature 302 that is convex, an opposite configuration is equally feasible.

FIG. 5A to FIG. 5C are various views of an example embodiment of the pad block of the clamp assembly of FIG. 1A.

The pad block 700 can be used to provide an elevated ledge against which the bottom rear corner 290 of the U-pad block 200 can press to create a proper clamping configuration. The pad block 700 includes a lower ledge 702, a middle ledge 704, an upper ledge 706, a lower ledge corner 708, a middle ledge corner 710, and sidewalls 712, 714. Pad block relief recesses 716 are provided to accommodate the stud 600 when using the upper ledge 706.

FIG. 6A to FIG. 6D show the clamp assembly of FIG. 1A in various clamping configurations using a lower ledge of the pad block. These various clamping configurations are not meant to be limiting. Many other configurations are possible.

In these example clamping configurations, a workpiece 800 sits on a worktable 802 and abuts a fixed element 804. The anchor nut 400 is disposed in a dovetail slot 806 in the worktable 802 and the tightening nut 500 has tightened the clamp assembly 100 together and onto the workpiece 800. Using an anchor nut 400 in the slot 806 in this manner allows a user to position the clamp assembly 100 anywhere in the slot 806 along a direction indicated by the double arrow. This, in turn, allows the user to optimize the position of the clamp assembly 100 relative to the workpiece 800.

In FIG. 6A, the bottom rear corner 290 rests on the lower ledge 702. The clamping groove front corner 264 and the front side 284FS of the clamping groove 204 provide a downward clamping force Fd on the workpiece 800. Friction between the bottom rear corner 290 and the lower ledge 702 helps hold the U-pad body 200 in position laterally relative to the pad block 700. This, in turn, allows the clamping groove rear corner 266 to apply a lateral clamping force Fl on the workpiece 800. In certain example embodiments, the U-pad body 200 is composed of a resilient material such as plastic and/or rubber etc. Resilient materials may allow for relatively greater friction between the bottom rear corner 290 and the lower ledge 702 which, in turn, allows for relatively greater lateral clamping force Fl.

The concave shape 234 of the pivot groove 230, the pivot groove rear corner 240, and the convex dowel surfaces 308 cooperate to provide the pivot connection that enables the proper angular positioning of the U-pad body 200.

In FIG. 6B, the workpiece 800 is relatively shorter than that of FIG. 6A. As a result, the clamping groove front corner 264 alone provides the downward clamping force Fd on the workpiece 800. The clamping groove rear corner 266 is no longer in contact with the workpiece 800. Instead, the rear side 284RS of the clamping groove 204 applies the lateral clamping force Fl on the workpiece 800.

Figure 6C:
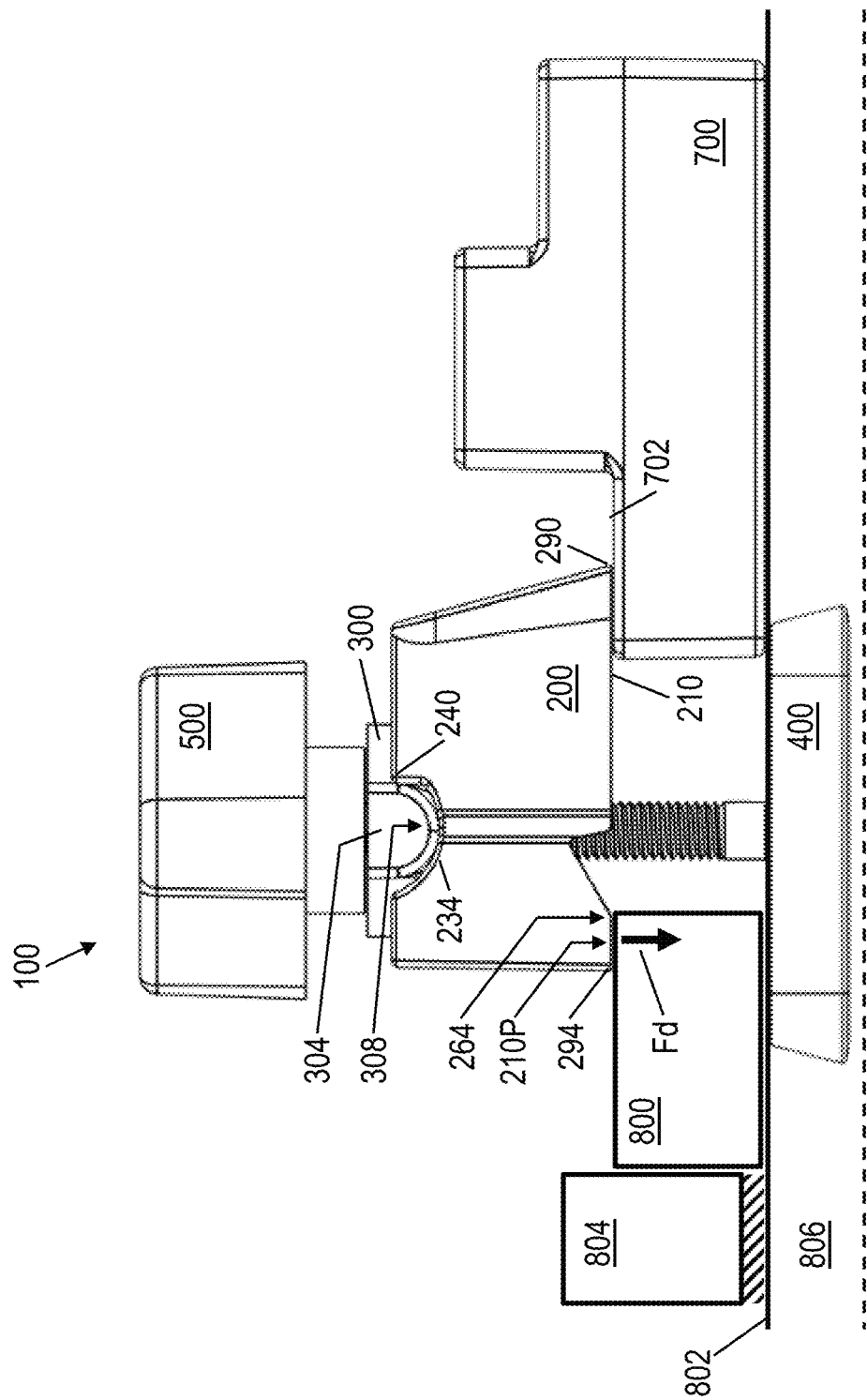

In FIG. 6C, the workpiece 800 is relatively shorter than that of FIG. 6B. As a result, at least one of the bottom 210 and the bottom rear corner 290 rests on the lower ledge 702. The clamping force Fd is provided by at least one of the clamping groove front corner 264, the portion 210P of the bottom 210, and the bottom front clamping corner 294. However, no lateral force Fl is applied to the workpiece by any part of the clamping groove 204.

FIG. 6D shows an embodiment in which the U-Pad body 200' and the adapter body 300' have been modified to permit this clamping configuration for a workpiece that is relatively shorter than that of FIG. 6C. In FIG. 6C, the bottom 210 rests on a corner of the lower ledge 702. The pivot groove rear corner 240 of the U-pad body 200 remains on the pivot dowel 304 but has moved beyond the convex dowel surfaces 308. The bottom front clamping corner 294 alone applies the downward clamping force Fd. No lateral force FI is applied to the workpiece by any part of the clamping groove 204.

FIG. 7 shows the clamp assembly 100 in a clamping configuration using the middle ledge 704 of the pad block 700. This clamping configuration is similar to that shown in FIG. 6B but for a workpiece 800 that is relatively taller than that of FIG. 6B.

FIG. 8 shows the clamp assembly 100 in a clamping configuration using an upper ledge 706 of the pad block 700. This clamping configuration is also similar to that shown in FIG. 6B. The pad block relief recess 716 is necessary to accommodate the stud 600 so the bottom rear corner 290 can reach the upper ledge 706 of the pad block 700.

Figure 9:
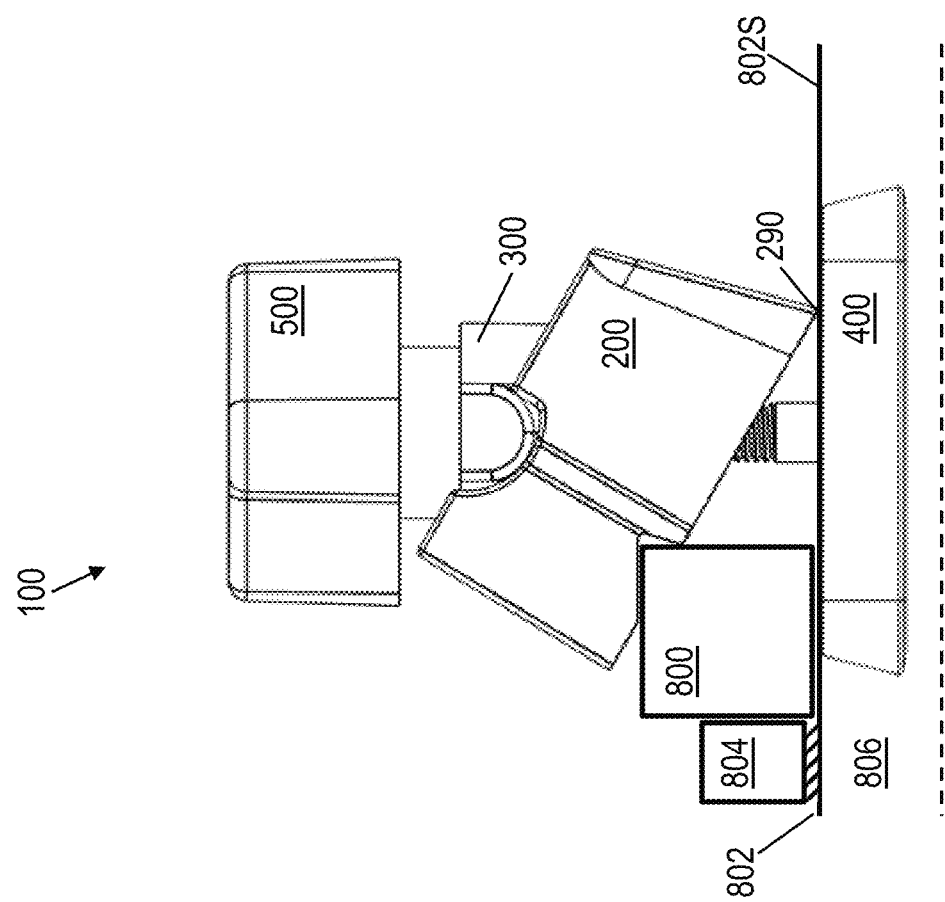
FIG. 9 shows the clamp assembly of FIG. 1A in a clamping configuration using the upper surface of the worktable.

FIG. 9 shows the clamp assembly 100 in a clamping configuration using the upper surface 802S of the worktable 802 instead of the pad block 700. This clamping configuration is similar to that shown in FIG. 6A.

Figure 10A:
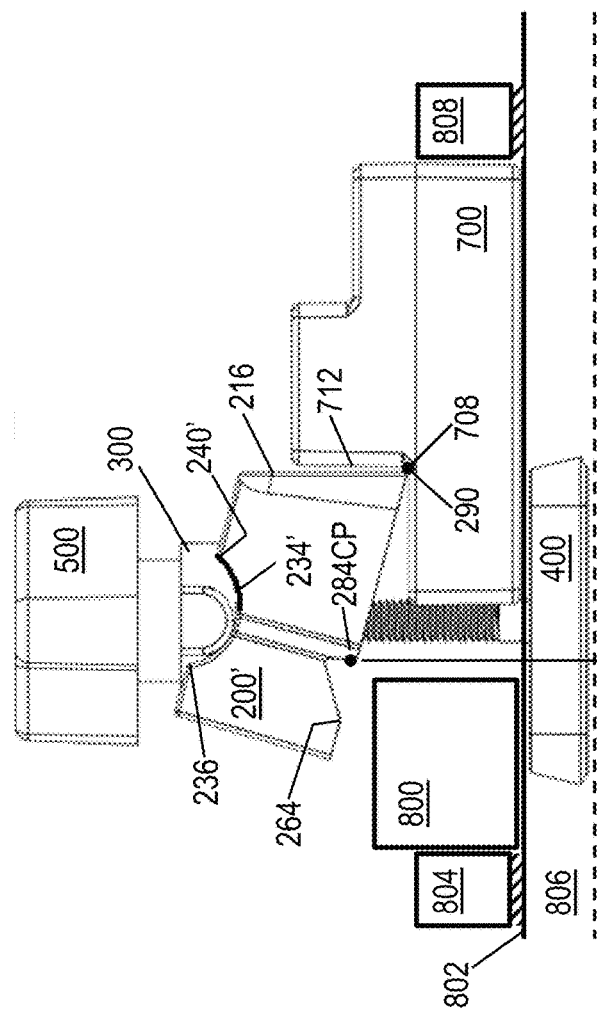
FIG. 10A and FIG. 10B show an alternate example embodiment of the clamp assembly progressing through a clamping operation.
Figure 10B:
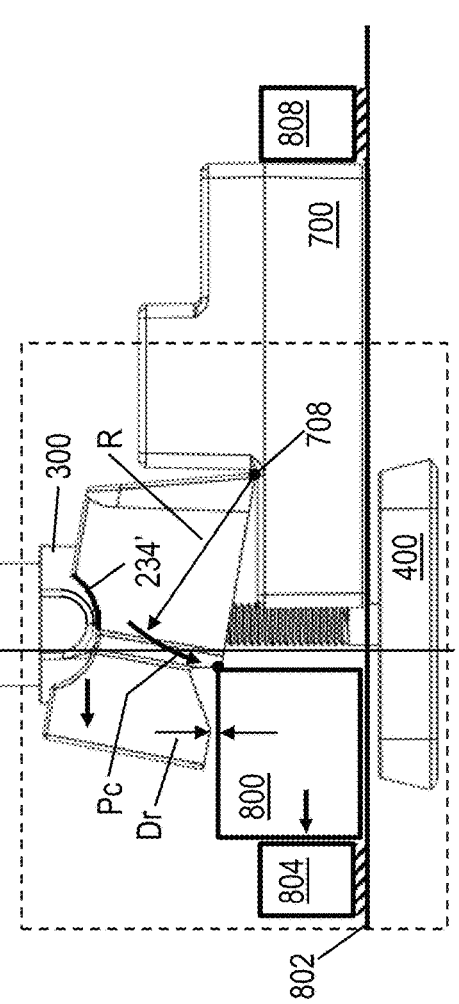

FIG. 10A and FIG. 10B show an alternate example embodiment of the clamp assembly progressing through a clamping operation. FIG. 10C is a closeup of the area indicated in FIG. 10B. FIG. 10D is a closeup of the area indicated in FIG. 10C.

In this example embodiment, the bottom rear corner 290 of the U-pad body 200' is placed in the lower ledge corner 708 of the pad block 700, which is possible when there is no interference between the rear side 216 of the U-pad body 200' and the sidewall 712. The pad block 700 is secured by a fixed element 808, which prevents the bad block 700 from sliding laterally (to the right as shown in FIG. 10A). The pad block 700 can be fixed in other ways known to the artisan and/or may have a resilient material on the bottom to increase friction.

This transfers the pivot point of the U-pad body to the bottom rear corner 290 of the U-pad body 200'. As the tightening nut 500 is tightened, the U-pad pivots about the bottom rear corner 290. A contact point 284CP on the rear side 284RS moves along a circumferential path Pc defined by Radius R. When moving along the circumferential path Pc, the contact point 284CP translates both downward and horizontally/laterally (left) as shown between FIG. 10A and FIG. 10B. This lateral translational movement is made possible by an alternate pivot groove 230' which does not have the non-concave shape 242 that limits lateral movement. Instead, the pivot groove 230' has a concave shape 234' that terminates at the pivot groove front corner 236 and at the pivot groove rear corner 240' and permits the U-pad body 200' to move to the left relative to the adapter body 300 as indicated by the left arrow.

Reference line Lr indicates the initial horizontal/lateral starting position of the contact point 284CP in FIG. 10A. As seen in FIG. 10B to FIG. 10D, when the contact point 284CP reaches the workpiece 800, the contact point 284CP has translated horizontally/laterally left relative to its initial horizontal/lateral starting position by an translation amount Ta. However, the clamping groove front corner 264 has not made contact with the workpiece 800. Instead, the clamping groove front corner 264 is a remaining distance Dr form the workpiece 800.

To close the remaining distance Dr, the tightening nut 500 must be further advanced along the stud 600. This will cause the U-pad body 200' to continue to rotate about the bottom rear corner 290. This would normally cause the contact point 284CP to continue along path Pc, thereby moving the contact point 284CP further left toward the workpiece 800. However, the workpiece 800 is held in its lateral position by the fixed element 804. For example embodiments where the U-pad body 200' is composed of a resilient material, a resiliency of the resilient material will allow the U-pad body 200' to yield at the contact point 284CP during the continued rotation of the U-pad body 200'. This yielding will apply the lateral force FI (see e.g., FIG. 6B) on the workpiece 800 that increases as the tightening nut 500 is advanced.

Similarly, once the clamping groove front corner 264 reaches the workpiece 800 (Dr is reduced to zero), the resilience of the resilient material will enable the U-pad body 200' to yield at the clamping groove front corner 264. Further advancing of the tightening nut 500 will increase a degree to which the clamping groove front corner 264 yields, which will increase the clamping force Fd (see e.g., FIG. 6B) applied by the U-pad body 200'.

The resulting clamping configuration would be similar to that shown in FIG. 6B, but with a greater lateral force FI made possible by the leftward movement of the contact point 284CP and optional resilience of the U-pad body 200'.

In example embodiments where the U-Pad body 200' is not composed of a resilient material, advancing the tightening nut 500 after contact with the workpiece 800 can be enabled by optimizing the location of the clamp assembly 100 in the slot 806 and optimizing the configuration of the components of the clamping device 100 relative to each other. This optimization process can ensure the desired contacts, the desired downward clamping force Fd, and the desired lateral clamping force FI are achieved.

Figure 11:
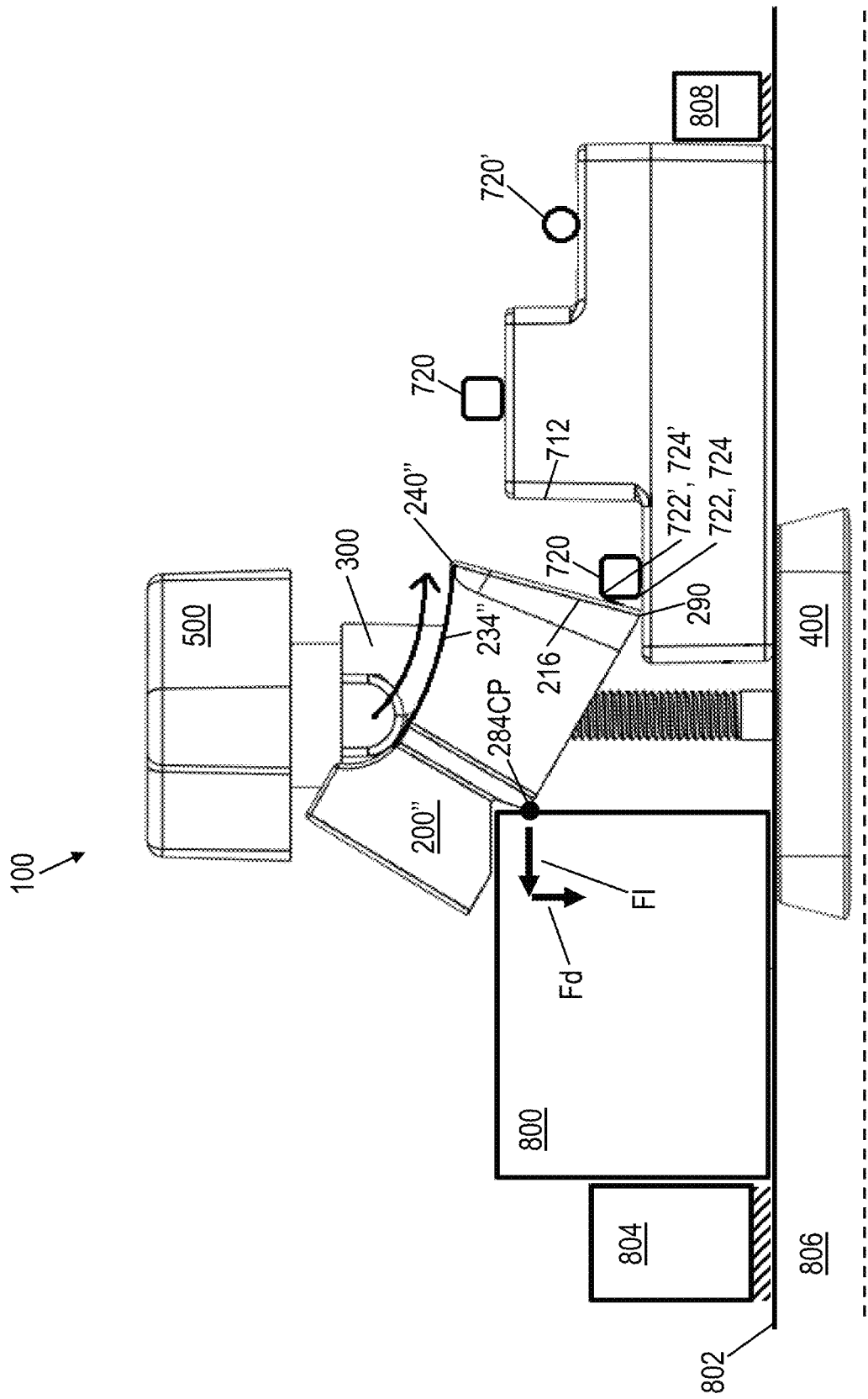
FIG. 11 shows an alternate example embodiment of the clamp assembly in a clamping configuration.

FIG. 11 shows an alternate example embodiment of the clamp assembly in a clamping configuration.

The clamping configuration of FIG. 11 is similar to that achieved in FIG. 6A and uses a process similar to the process of FIG. 10A to FIG. 10D to create the greater lateral force FI made possible by the leftward movement of the contact point 284CP and the optional resilience of the U-pad body 200. The concave shape 234" is modified, which moves the location of the pivot groove rear corner 240'. The movement of the adapter body 300 along the concave shape 234" and relative to the U-pad body 200" during the rotation of the U-pad body 200" is shown by the curved arrow. The movement includes lateral (leftward) translation of the U-pad body 200 relative to the adapter body 300.

In this example embodiment, the pad block 700 includes U-pad engaging features 720, 720' that are configured to engage the U-pad body 200" and prevent the U-pad body 200" from moving laterally (to the right as shown in FIG. 11). The U-pad engaging features 720, 720' are shorter than the sidewalls 712, 714 and thereby reduce or eliminate any interference between the rear wall 216 and the sidewall 712. This, in turn, allows for a wider range of angular positions of the U-pad body 200".

When the U-pad engaging feature 720 has a rectilinear cross section such as that shown in FIG. 11, a pivot point 722, 722' about which the contact point 284CP will rotate can change as the U-pad body 200" rotates counter clockwise. For example, when the rear wall 216 abuts an upper corner 724' of the U-pad engaging feature 720, the contact point 284CP rotates about upper pivot point 722'. During this rotation, the contact point 284CP moves downward and leftward, but the amount of leftward movement is not linearly related to the amount of rotation. Instead, the rate of leftward linear movement decreases with progressive rotation as the contact point 284CP approaches the same height as the upper pivot point 722'.

Upon reaching a select angular position of the U-pad body 200", the bottom rear corner 290 engages the lower corner 724 and the pivot point changes from pivot point 722' to pivot point 722, which is lower relative to the location of the contact point 284CP. Due to this lowering, when the U-pad body 200" is rotated past the select angular position the contact point 284CP will exhibit an increased rate of leftward movement compared to the rate of leftward movement exhibited immediately prior to reaching the select angular position. The increase rate of leftward movement leads to an increase in the possible lateral clamping force F1.

When the U-pad engaging feature 720' has a round cross section such as that shown in FIG. 11, the pivot point will constantly change as the U-pad body is rotated around the round cross section.

The cross-sectional shape of the U-pad engaging feature can be selected to control the rate of lateral movement of the contact point 284CP as desired throughout the rotation of the U-pad body 200". Additionally, recessed features such as grooves and the like may be formed in the ledges to act as U-pad engaging features. Resilient materials such as foam and the like may also be used as U-pad engaging features by contouring around and thereby engaging the lower corner 724.

The clamp assembly disclosed herein provides lateral clamping as well as downward clamping in a simple, compact, easily adjustable, and easily positionable clamp assembly, and represents an improvement in the art.

The invention claimed is:

1. An apparatus, comprising:
   a U-pad body comprising:
      a bottom, a top disposed opposite the bottom, and sides disposed between the bottom and the top; wherein the sides comprise a front side, a rear side opposite the front side, a first side between the front side and the rear side, and a second side between the front side and the rear side and opposite the first side;
      a clamping groove that is recessed into the bottom and that opens through the first side and through the second side; and
      a U-pad body pivot feature;
   an adapter body disposed atop the U-pad body and comprising an adapter pivot feature and an adapter body through hole;
   wherein the adapter pivot feature and the U-pad body pivot feature cooperate to enable the U-pad body to pivot relative to the adapter body;
   an anchor nut disposed below the U-pad body;
   a tightening nut disposed above the adapter body; and
   a stud that is secured to the anchor nut, that is secured to the tightening nut, and that is passes through the adapter body through hole and through the U-pad body.

2. The apparatus of claim 1, wherein the adapter pivot feature comprises a dowel that defines an adapter body pivot axis, wherein the U-pad body pivot feature comprises a pivot groove, and wherein the dowel and the pivot groove cooperate to enable the U-pad body to pivot around the adapter body pivot axis.

3. The apparatus of claim 2,
   wherein the pivot groove comprises a pivot groove first portion and a pivot groove second portion that is separated from the pivot groove first portion along a pivot groove longitudinal axis;
   wherein the U-pad body further comprises by an adapter recess that is recessed into the top, that is disposed between the pivot groove first portion and the pivot groove second portion, and that is configured to receive the adapter body at least partly therein; and
   wherein the dowel comprises a dowel first portion configured to cooperate with the pivot groove first portion and a dowel second portion configured to cooperate with the pivot groove second portion.

4. The apparatus of claim 2, wherein the wherein the dowel and the pivot groove also cooperate to enable the U-pad body to translate relative to the adapter body.

5. The apparatus of claim 1, wherein the clamping groove defines a clamping groove vertex and is asymmetric about the clamping groove vertex.

6. The apparatus of claim 5,
   wherein the clamping groove vertex defines a clamping groove longitudinal axis;
   wherein the clamping groove comprises:
      a clamping groove front corner that is formed where the clamping groove meets a bottom surface of the bottom, that is disposed between the clamping groove vertex and the front side, and that extends parallel to the clamping groove longitudinal axis; and
      a clamping groove rear corner that is formed where the clamping groove meets the bottom surface of the bottom, that is disposed between the clamping groove vertex and the rear side, and that extends parallel to the clamping groove longitudinal axis; and
   wherein a shortest distance from the clamping groove vertex to the clamping groove front corner is greater than a shortest distance from the clamping groove vertex to the clamping groove rear corner.

7. The apparatus of claim 6, wherein the U-pad body further comprises a bottom rear corner that is defined by the bottom and the rear side and that extends parallel to the clamping groove longitudinal axis.

8. An apparatus, comprising:
   a U-pad body comprising:
      a bottom, a top disposed opposite the bottom, and sides disposed between the bottom and the top; wherein the sides comprise a front side, a rear side opposite the front side, a first side between the front side and the rear side, and a second side between the front side and the rear side and opposite the first side;
      a clamping groove that is recessed into the bottom, that opens through the first side and through the second side, that defines a clamping groove vertex, and that is asymmetric about the clamping groove vertex, wherein the clamping groove vertex defines a clamping groove longitudinal axis; and
      a pivot groove that is recessed into the top, that extends between the first side and the second side, and that extends along a pivot groove longitudinal axis that is parallel to the clamping groove longitudinal axis;
   wherein the clamping groove comprises:
      a clamping groove front corner that is formed where the clamping groove meets a bottom surface of the bottom, that is disposed between the clamping groove vertex and the front side, and that extends parallel to the clamping groove longitudinal axis; and
      a clamping groove rear corner that is formed where the clamping groove meets the bottom surface of the bottom, that is disposed between the clamping groove vertex and the rear side, and that extends parallel to the clamping groove longitudinal axis.

9. The apparatus of claim 8, wherein the U-pad body further comprises a bottom rear corner that is defined by the bottom and the rear side and that extends parallel to the clamping groove longitudinal axis.

10. The apparatus of claim 9, wherein the U-pad body further comprises a bottom front clamping corner that is defined by the bottom and the front side, that extends parallel to the clamping groove longitudinal axis, and that is set apart from the clamping groove front corner.

11. The apparatus of claim 8, wherein a shortest distance from the clamping groove vertex to the clamping groove front corner is greater than a shortest distance from the clamping groove vertex to the clamping groove rear corner.

12. The apparatus of claim 8,
wherein a normal line is disposed normal to the bottom surface and passes through the clamping groove longitudinal axis at an intersection point;
wherein a front line is defined by a shortest distance from the intersection point to the clamping groove front corner;
wherein a rear line is defined by a shortest distance from the intersection point to the clamping groove rear corner;
wherein the front line and the normal line define a front bevel angle;
wherein the rear line and the normal line define a rear bevel angle; and
wherein the front bevel angle is larger than the rear bevel angle.

13. The apparatus of claim 12,
wherein the front line and the rear line define a groove bevel angle; and
wherein the groove bevel angle is less than ninety (90) degrees.

14. The apparatus of claim 8,
wherein the pivot groove defines a pivot groove front corner that is formed where the pivot groove meets a top surface of the top and that extends parallel to the pivot groove longitudinal axis; and
wherein the pivot groove defines a pivot groove rear corner that is formed where the pivot groove meets the top surface of the top and that extends parallel to the pivot groove longitudinal axis.

15. The apparatus of claim 14, wherein the pivot groove comprises a concave shape that terminates at the pivot groove front corner and a non-concave shape that terminates at the pivot groove rear corner.

16. The apparatus of claim 14, wherein the pivot groove comprises a concave shape that terminates at the pivot groove front corner and at the pivot groove rear corner.

17. The apparatus of claim 8, further comprising an adapter body, wherein the adapter body comprises a pivot dowel that defines an adapter body pivot axis and that is configured to cooperate with the pivot groove to enable the U-pad body to pivot around the adapter body pivot axis.

18. The apparatus of claim 17,
wherein the pivot groove comprises a pivot groove first portion and a pivot groove second portion that is separated from the pivot groove first portion along the pivot groove longitudinal axis;
wherein the U-pad body further comprises an adapter recess that is recessed into the top, that is disposed between the pivot groove first portion and the pivot groove second portion, and that is configured to receive the adapter body at least partly therein; and
wherein the pivot dowel comprises a dowel first portion configured to cooperate with the pivot groove first portion and a dowel second portion configured to cooperate with the pivot groove second portion.

19. The apparatus of claim 18,
wherein the U-pad body further comprises a U-pad body slot that passes therethrough from the adapter recess through the bottom and that is elongated along a slot longitudinal axis that is oriented perpendicular to the pivot groove longitudinal axis; and
wherein the adapter body further comprises: an adapter body upper surface; and an adapter body through hole oriented perpendicular to the adapter body upper surface and configured to align with the U-pad body slot.

20. The apparatus of claim 19, further comprising:
an anchor nut disposed below the U-pad body;
a tightening nut disposed above the adapter body upper surface; and
a stud that is secured to the anchor nut, that is secured to the tightening nut, and that is passes through the adapter body through hole and the U-pad body slot.

21. An apparatus, comprising:
a U-pad body comprising:
a bottom, a top disposed opposite the bottom, and sides disposed between the bottom and the top; wherein the sides comprise a front side, a rear side opposite the front side, a first side between the front side and the rear side, and a second side between the front side and the rear side and opposite the first side;
a clamping groove that is recessed into the bottom, that opens through the first side and through the second side, that defines a clamping groove vertex, and that is asymmetric about the clamping groove vertex, wherein the clamping groove vertex defines a clamping groove longitudinal axis; and
a pivot groove that is recessed into the top, that extends between the first side and the second side, and that extends along a pivot groove longitudinal axis that is parallel to the clamping groove longitudinal axis;
wherein the pivot groove defines a pivot groove front corner that is formed where the pivot groove meets a top surface of the top and that extends parallel to the pivot groove longitudinal axis; and
wherein the pivot groove defines a pivot groove rear corner that is formed where the pivot groove meets the top surface of the top and that extends parallel to the pivot groove longitudinal axis.

* * * * *